United States Patent
Ohira et al.

(10) Patent No.: US 9,350,021 B2
(45) Date of Patent: May 24, 2016

(54) CATHODE ACTIVE MATERIAL, CATHODE, AND NONAQUEOUS SECONDARY BATTERY

(71) Applicant: Sharp Kabushiki Kaisha, Osaka (JP)

(72) Inventors: Koji Ohira, Osaka (JP); Motoaki Nishijima, Osaka (JP); Yuichi Kamimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 139 days.

(21) Appl. No.: 14/372,684

(22) PCT Filed: Dec. 28, 2012

(86) PCT No.: PCT/JP2012/084035
§ 371 (c)(1),
(2) Date: Jul. 16, 2014

(87) PCT Pub. No.: WO2013/108570
PCT Pub. Date: Jul. 25, 2013

(65) Prior Publication Data
US 2015/0017538 A1    Jan. 15, 2015

(30) Foreign Application Priority Data

Jan. 17, 2012    (JP) ................................. 2012-007395

(51) Int. Cl.
| | | |
|---|---|---|
| *H01M 4/02* | (2006.01) | |
| *H01M 4/58* | (2010.01) | |
| *C01B 25/45* | (2006.01) | |
| *H01M 10/0525* | (2010.01) | |
| *H01M 10/052* | (2010.01) | |

(52) U.S. Cl.
CPC ............. *H01M 4/5825* (2013.01); *C01B 25/45* (2013.01); *H01M 10/0525* (2013.01); *H01M 10/052* (2013.01); *H01M 2220/20* (2013.01); *H01M 2220/30* (2013.01)

(58) Field of Classification Search
CPC ....................................................... H01M 4/02
See application file for complete search history.

(56) References Cited

U.S. PATENT DOCUMENTS

| | | | |
|---|---|---|---|
| 2006/0222946 A1 | 10/2006 | Okada et al. | |
| 2011/0195304 A1 | 8/2011 | Abe et al. | |

FOREIGN PATENT DOCUMENTS

| | | |
|---|---|---|
| JP | 2000-509193 A | 7/2000 |
| JP | 2001-307731 A | 11/2001 |
| JP | 2005-519451 A | 6/2005 |
| JP | 2005-522009 A | 7/2005 |
| JP | 2006-516172 A | 6/2006 |
| JP | 2006-278256 A | 10/2006 |
| JP | 2008-506243 A | 2/2008 |
| JP | 2006-523368 A | 10/2008 |
| JP | 2010-095432 A | 4/2010 |
| JP | 2010-510631 A | 4/2010 |
| WO | WO 97/40541 A1 | 10/1997 |
| WO | WO 03/038930 A2 | 5/2003 |
| WO | WO 03/077335 A1 | 9/2003 |
| WO | WO 03/085757 A1 | 10/2003 |
| WO | WO 2004/095607 A2 | 11/2004 |
| WO | WO 2006/009355 A1 | 1/2006 |
| WO | WO 2008/061174 A2 | 5/2008 |

OTHER PUBLICATIONS

International Search Report for corresponding International Application No. PCT/JP2012/084035 mailed Feb. 19, 2013.

*Primary Examiner* — Jacob Marks
(74) *Attorney, Agent, or Firm* — Renner, Otto, Boisselle & Sklar, LLP

(57) ABSTRACT

Provided is a cathode active material which is superior in safety and cost and makes it possible to provide a nonaqueous secondary battery having a long life. The cathode active material has a composition represented by the following formula (1):

$$LiMn_{1-x}M_xP_{1-y}Al_yO_4 \qquad (1)$$

(wherein M is at least one selected from the group consisting of Ti, V, Zr, Sn and Y, x is in a range of 0<x≤0.5, and y is in a range of 0<y≤0.25).

5 Claims, No Drawings

CATHODE ACTIVE MATERIAL, CATHODE, AND NONAQUEOUS SECONDARY BATTERY

TECHNICAL FIELD

The present invention relates to a cathode active material, a cathode, and a nonaqueous secondary battery. More specifically, the present invention relates to a cathode active material capable of providing a nonaqueous secondary battery having high potential and superior cycle characteristics, a cathode in which this cathode active material is used, and a nonaqueous secondary battery in which this cathode is used.

BACKGROUND ART

Nonaqueous secondary batteries (for example, lithium ion secondary batteries; hereinafter simply referred to as batteries) have been put into practical use and widely used as secondary batteries for portable electronic devices. Further, in recent years, lithium secondary batteries have attracted attention not only as small batteries for portable electronic devices but also as large-capacity batteries for in-car use, power storage use, and the like. Therefore, regarding these batteries, demand for safety, lower manufacturing cost, longer life, and the like has been increased.

In general, a layered transition metal oxide represented by $LiCoO_2$ is used as a cathode active material included in the nonaqueous secondary battery. However, the layered transition metal oxide is likely to undergo oxygen as generation at a relatively low temperature around 150° C. when the layered transition metal oxide is fully charged. The oxygen gas desorption accelerate a self-heating, which could cause a thermal runaway reaction in which oxygen gas is continuously generated. Accordingly, in a nonaqueous secondary battery having such a cathode active material, problems such as heat generation or ignition may occur.

In particular, high safety is required for large-sized and large-capacity nonaqueous secondary batteries for in-car use and power storage use. Therefore, it is expected that lithium manganate ($LiMn_2O_4$) having a spinel structure, lithium iron phosphate ($LiFePO_4$) having an olivine structure, and the like will be used as the cathode active material because they have a stable structure and do not desorb oxygen under abnormal conditions.

In addition, a significant increase in the usage of cathode active materials is expected due to the wide use of nonaqueous secondary batteries for in-car use. Therefore, there is a problem of depletion of resources of elements included in cathode active materials. In particular, it is required that the use of cobalt (Co) as a resource be reduced due to its low crustal abundance. Therefore, it is expected that lithium nickelate ($LiNiO_2$) and a solid solution thereof ($Li(Co_{1-x}Ni_x)O_2$), lithium manganate ($LiMn_2O_4$), lithium iron phosphate ($LiFePO_4$), and the like will be used as the cathode active material.

$LiFePO_4$ has been widely studied from the viewpoints of improving safety and preventing depletion of resources. As a result of such studies, $LiFePO_4$ has been put into practical use as a cathode active material through refinement of $LiFePO_4$ particles, substitution of Fe and P with another element, and improvement of carbon coating on particle surfaces.

As compared to other cathode active materials, $LiFePO_4$ has a problem of, for example, a low average potential value of 3.4 V. From the viewpoint of average potential, a cathode active material having an olivine structure with high potential such as $LiMnPO_4$ has been studied. However, since $LiMnPO_4$ has a lower conductivity than $LiFePO_4$, it is known that Li intercalation/deintercalation is difficult (refer to PTL 1).

Therefore, substitution of a part of Mn with another element has been proposed to increase the charge-discharge capacity through improvement of charge-discharge characteristics (for example, refer to PTL 2). In addition, an active material represented by the formula $A_aM_b(XY_4)_cZ_d$ (wherein A is an alkali metal, M is a transition metal, $XY_4$ is $PO_4$ or the like, and Z is OH or the like) has been proposed (for example, refer to PTL 3).

In addition, an active material represented by the formula $LiMP_{1-x}A_xO_4$ (wherein M is a transition metal, A is an element having an oxidation number of +4 or less, and x is in a range of 0<x<1) in which the P site is substituted with A has been proposed (for example, refer to PTL 4).

CITATION LIST

Patent Literature

PTL 1: Japanese Unexamined Patent Application Publication (Translation of PCT Application) No. 2000-509193
PTL 2: Japanese Unexamined Patent Application Publication No. 2001-307731
PTL 3: Japanese Unexamined Patent Application Publication (Translation of PCT Application) No. 2005-522009
PTL 4: Japanese Unexamined Patent Application Publication (Translation of PCT Application) No. 2008-506243

SUMMARY OF INVENTION

Technical Problem $LiMnPO_4$ has a problem in that it is difficult to obtain a theoretical charge-discharge capacity. This problem has been identified as being caused by low conductivity. However, the present inventors thought that $LiMnPO_4$ greatly expands or shrinks due to Li intercalation/deintercalation caused by charging/discharging, a structural change by Li intercalation/deintercalation is increased, and thus the life of a battery cannot be increased.

Accordingly, the present inventors have thoroughly studied cathode active materials having a low volume change ratio caused by Li intercalation/deintercalation and capable of improving a charge-discharge capacity, thereby completing the present invention.

Solution to Problem

According to the present invention, $LiMnPO_4$ having an olivine structure is used as a base structure, and part of Mn and P is substituted with another element. As a result, a volume change caused by Li intercalation/deintercalation is suppressed, and the capacity of a battery is increased.

Specifically, the present inventors found that a volume change caused by Li intercalation/deintercalation is suppressed in a cathode active material which is obtained by substituting the P site with Al and substituting the Mn site with a trivalent or tetravalent element while performing charge compensation, thereby completing the present invention.

According to the present invention, there is provided a cathode active material having a composition represented by the following formula (1):

$$LiMn_{1-x}M_xP_{1-y}Al_yO_4 \qquad (1)$$

(wherein M is at least one selected from the group consisting of Ti, V, Zr, Sn, and Y, x is in a range of 0<x≤0.5, and y is in a range of 0<y≤0.25).

In addition, according to the present invention, there is provided a cathode including: the above-described cathode active material; an electrically conductive material; and a binder.

Further, according to the present invention, there is provided a nonaqueous secondary battery including: the above-described cathode; an anode; an electrolyte; and a separator.

Advantageous Effects of Invention

In the cathode active material according to the present invention, since a volume change caused by charging and discharging can be suppressed, a high charge-discharge capacity can be obtained. In addition, since a potential caused by a change in the valence of Mn is obtained as a potential during charging and discharging, an average potential higher than that of $LiFePO_4$ can be obtained. Further, since a volume change is small, the life of a battery can be increased.

In addition, when the cathode active material has a volume change ratio of 8% or lower caused by Li intercalation/deintercalation, a volume change is further suppressed. Therefore, a cathode active material having a long life can be provided.

Further, when M is Zr and x is in a range of 0.01≤x≤0.25, a volume change is further suppressed. Therefore, a cathode active material having a long life can be provided.

DESCRIPTION OF EMBODIMENTS

Hereinafter, the present invention will be described in detail. In this specification, "A to B" indicating a range represents more than or equal to A and less than or equal to B. In addition, various physical properties exemplified in this specification represent values measured using methods described in Examples below unless specified otherwise.

(1) Cathode Active Material

A cathode active material according to an embodiment of the present invention has a composition represented by the following formula (1):

$$LiMn_{1-x}M_xP_{1-y}Al_yO_4 \quad (1)$$

(wherein M is at least one selected from the group consisting of Ti, V, Zr, Sn, and Y, x is in a range of 0<x≤0.5, and y is in a range of 0<y≤0.25).

Typically, in the case of olivine-type $LiMnPO_4$, an initial volume of a crystal structure shrinks due to Li deintercalation caused by charging. This volume shrinkage is caused by an a-axis and a b-axis of an initial crystal structure shrinking and a c-axis expanding. Therefore, the present inventors thought that, by substitution of any of constituent elements of $LiMnPO_4$, a shrinkage rate of the a-axis and the b-axis will be reduced, an expansion rate of the c-axis is increased, and thus the volume shrinkage would be able to be suppressed.

As a result of a specific study, the present inventors found that a volume change caused by Li deintercalation can be suppressed by substituting a part of the P site with Al and substituting a part of the Mn site with another element while performing charge compensation in a crystal structure; as a result, a capacity decrease caused by repeated charging and discharging can be suppressed.

Substantially all the cathode active materials having the above-described composition represented by the formula (1) have an olivine structure. However, the scope of the present invention includes cathode active materials having the above-described composition represented by the formula (1) and not having an olivine structure. Such cathode active materials are also included in the present invention.

The olivine structure described in the present invention is represented by a crystal structure of olivine and refers to a structure in which oxygen atoms have a substantially hexagonal closest packing structure and other atoms enter gaps in the hexagonal closest packing structure.

In the cathode active material according to the present invention, the P site is substituted with Al. Here, since the valences of P and Al are different from each other, charge compensation in a crystal structure is required to be made. Therefore, the Mn site is substituted with M.

Here, in the formula (1), the valence of P is +5, and the valence of Al is +3. According to the principle that a total charge in a crystal structure is zero, a substitution amount y of Al satisfies an expression of y×2=x×(valence of M−2).

In addition, Mn may contain a small amount of Mn having a valence of +3. In this case, when the substitution amount y of Al is in a range of x×(valence of M−2)−0.05<y×2<x×(valence of M−2)+0.05, charge compensation can be made.

In addition, a change ratio of a volume of a unit lattice in $Li_AMn_{1-x}M_xP_{1-y}Al_yO_4$ (wherein A is in a range of 0 to x) after Li deintercalation to a volume of a unit lattice in the formula (1) is preferably 8% or lower. When the volume change ratio is 8% or lower, a capacity retention ratio of 500 cycles can be made to be 80% or higher. M with which the Mn site is substituted is at least one selected from the group consisting of Ti, V, Zr, Sn, and Y. Accordingly, M may be any one of the five elements or a combination of two or more elements. In addition, an element having a valence of +3 or +4 is preferable as M with which the Mn site is substituted. In particular, since an effect of suppressing the volume change ratio is high, it is more preferable that the Mn site be substituted with an element having a valence of +4. M may be a mixture of elements having plural valences. In this case, a valence defining the above-described y is an average valence.

Y is preferable as M having a valence of +3 with which the Mn site can be substituted because the valence does not change during synthesis. Since the valence does not change during synthesis, the cathode active material can be stably synthesized.

Zr or Sn is preferable as M having a valence of +4 with which the Mn site can be substituted because the valence does not change during synthesis. Since the valence does not change during synthesis, the cathode active material can be stably synthesized.

A substitution amount x of the Mn site is in a range of more than 0 to 0.5. Within the above-described range, a volume change caused by Li intercalation/deintercalation can be suppressed without a discharge capacity of a nonaqueous secondary battery, which is manufactured using the cathode active material, being significantly decreased.

As the substitution amount of the Mn site increases, the volume change ratio can be suppressed. In other words, as the substitution amount of the Mn site increases, a capacity retention ratio of 100 cycles is improved. When the volume change ratio is 8% or lower, the capacity retention ratio can be made to be 80% or higher.

When the Mn site is substituted with M having a valence of +3, the amount of Al for maintaining electroneutrality is half of the substitution amount of the Mn site. In this case, the substitution amount x is preferably 0.1 or more.

When the Mn site is substituted with M having a valence of +4, the amount of Al for maintaining electroneutrality is equal to the substitution amount of the Mn site. In this case, the substitution amount x is preferably 0.05 or more.

Conversely, as the substitution amount of the Mn site increases, the initial capacity decreases. Depending on substitution elements, the theoretical capacity varies, and the valence of only Mn changes. From this point of view, the theoretical capacity depending on the substitution amount can be obtained.

When Mn is substituted with Zr, the substitution amount x of the Mn site is preferably 0.35 or less from the viewpoint of obtaining an initial capacity of 100 mAh/g or higher. In addition, the substitution amount x of the Mn site is more preferably 0.3 or less from the viewpoint of obtaining an initial capacity of 110 mAh/g or higher. Further, the substitution amount x of the Mn site is particularly preferably 0.25 or less from the viewpoint of obtaining an initial capacity of 120 mAh/g or higher.

When Mn is substituted with Sn, the substitution amount x of the Mn site is preferably 0.3 or less from the viewpoint of obtaining an initial capacity of 100 mAh/g or higher. In addition, the substitution amount x of the Mn site is more preferably 0.2 or less from the viewpoint of obtaining an initial capacity of 110 mAh/g or higher. Further, the substitution amount x of the Mn site is particularly preferably 0.25 or less from the viewpoint of obtaining an initial capacity of 120 mAh/g or higher.

When Mn is substituted with Y, the substitution amount x of the Mn site is preferably 0.35 or less from the viewpoint of obtaining an initial capacity of 100 mAh/g or higher. In addition, the substitution amount x of the Mn site is more preferably 0.3 or less from the viewpoint of obtaining an initial capacity of 110 mAh/g or higher. Further, the substitution amount x of the Mn site is particularly preferably 0.25 or less from the viewpoint of obtaining an initial capacity of 120 mAh/g or higher.

Preferable cathode active materials are as follows.

$LiMn_{1-x}Y_xP_{1-y}Al_yO_4$ ($0.1 \leq x \leq 0.35$, $0.05 \leq y \leq 0.175$)
$LiMn_{1-x}Zr_xP_{1-y}Al_yO_4$ ($0.05 \leq x \leq 0.35$, $0.05 \leq y \leq 0.35$)
$LiMn_{1-x}Sn_xP_{1-y}Al_yO_4$ ($0.05 \leq x \leq 0.3$, $0.05 \leq y \leq 0.3$)

The cathode active material can be manufactured using a solid-phase method, a sol-gel method, a melt quenching method, a mechanochemical method, a coprecipitation method, a hydrothermal method, a spray-pyrolysis method, or the like. Examples of a material forming the cathode active material include a carbonate, a hydroxide, a chloride, a sulfate, an acetate, an oxide, an oxalate, a nitrate, or an alkoxide containing any of these elements. These materials may be combined as desired. In addition, these materials may contain water of crystallization.

In addition, the conductivity may be improved using a method of coating the cathode active material with a carbon coating film which is commonly performed in olivine type lithium iron phosphate.

(II) Nonaqueous Secondary Battery

A nonaqueous secondary battery includes a cathode, an anode, an electrolyte, and a separator. Hereinafter, each constituent material will be described.

(a) Cathode

The cathode includes the above-described cathode active material, an electrically conductive material, and a binder.

The cathode is obtained by, for example, a method such as a method in which a slurry, which is obtained by mixing a cathode active material, an electrically conductive material, and a binder with an organic solvent, is applied to a current collector, a method in which mixed powder including a binder, an electrically conductive material, and a cathode active material is formed into a sheet shape and the formed sheet is pressed against a current collector.

As the cathode active material, a mixture of the above-described cathode active material and another cathode active material (for example, $LiCoO_2$, $LiMn_2O_4$, or $LiFePO_4$) may be used.

Examples of the binder include polytetrafluoroethylene, polyvinylidene-fluoride, polyvinylchloride, ethylene-propylene-diene polymer, styrene-butadiene rubber, acrylonitrile-butadiene rubber, fluoro-rubber, polyvinyl acetate, polymethylmethacrylate, polyethylene, and nitrocellulose.

Examples of the electrically conductive material include acetylene black, carbon, graphite, natural graphite, artificial graphite, and needle coke.

Examples of the current collector include a foam (porous) metal having contiguous holes, a honeycomb metal, a sintered metal, an expanded metal, nonwoven metal fabric, a metal plate, a metal foil, a metal plate with holes, and a metal mesh. Examples of the metal include stainless steel and copper.

Examples of the organic solvent include N-methylpyrrolidone, toluene, cyclohexane, dimethylformamide, dimethylacetamide, methylethyl ketone, methyl acetate, methyl acrylate, diethyltriamine, N-N-dimethylaminopropylamine, ethylene oxide, and tetrahydrofuran.

The thickness of the cathode is preferably about 0.01 mm to 20 mm. It is not preferable that the thickness be too large, because conductivity decreases. It is not preferable that the thickness be too small because the capacity per unit area decreases. The cathode obtained by application and drying may be pressed by a roller press or the like to increase the packing density of the cathode active material.

(b) Anode

The anode includes an anode active material, an electrically conductive material, and a binder.

The anode can be manufactured using a well-known method. Specifically, the anode can be manufactured using a method the same as the above-described method of manufacturing the cathode.

A well-known material can be used as the anode active material. For realization of a high-energy density battery, it is preferable to employ an anode active material whose potential at which Li intercalation/deintercalation occurs is close to one at which precipitation and dissolution of metal lithium occur. Typical examples of the anode active material include carbon materials such as a particulate (for example, scale-like, aggregated, fibrous, whisker-like, spherical, or pulverized-particle-like) natural or artificial graphite.

Examples of the artificial graphite include graphite obtained by graphitizing mesocarbon microbeads, a mesophase pitch powder or an isotropic pitch powder. In addition, a graphite particle having a surface on which amorphous carbon is adhered can be used. Among these, the natural graphite is more preferable because it is inexpensive, has a potential close to a redox potential of lithium, and thus can form a high-energy density battery.

In addition, a lithium transition metal oxide, a lithium transition metal nitride, a transition metal oxide, oxide silicon, or the like can also be used as the anode active material. Among these, $Li_4Ti_5O_{12}$ is more preferable because it has high flatness of a potential, and undergoes a smaller volume change caused by charging/discharging.

As the electrically conductive material and the binder, any exemplary materials of those of the cathode can be used.

(c) Electrolyte

Examples of the electrolyte include an organic electrolytic solution, a gel-like electrolyte, a solid polymer electrolyte, an solid inorganic electrolyte, and a molten salt.

Examples of an organic solvent included in the organic electrolyte solution include: cyclic carbonates such as propylene carbonate (PC), ethylene carbonate (EC), and butylene carbonate; chain carbonates such as dimethyl carbonate (DMC), diethyl carbonate (DEC), ethylmethyl carbonate, and dipropyl carbonate; lactones such as γ-butyrolactone (GBL) and γ-valerolactone; furans such as tetrahydrofuran and 2-methyltetrahydrofuran; ethers such as diethyl ether, 1,2-dimethoxyethane, 1,2-diethoxyethane, ethoxymethoxyethane, and dioxane; dimethylsulfoxide; sulfolane; methylsulfolane; acetonitrile; methyl formate; and methyl acetate. These organic solvents may be used alone or as a mixture of two or more kinds.

In addition, the cyclic carbonates such as PC, EC, and butylene carbonate are high boiling point solvents. Therefore, when the cyclic carbonates are used, it is preferable that the cyclic carbonates be mixed with GBL.

Examples of an electrolyte salt included in the organic electrolyte solution include lithium salts such as lithium borofluoride ($LiBF_4$), lithium hexafluorophosphate ($LiPF_6$), lithium trifluoromethanesulfonate ($LiCF_3SO_3$), lithium trifluoroacetate ($LiCF_3COO$), and lithium-bis(trifluoromethanesulfon)imide($LiN(CF_3SO_2)_2$). These electrolyte salts may be used alone or as a mixture of two or more kinds. A salt concentration of the electrolyte solution is preferably 0.5 mol/l to 3 mol/l.

(d) Separator

The separator is positioned between the cathode and the anode.

Examples of the separator include a porous material and unwoven fabric. As a material of the separator, the above-described materials which do not dissolve or swell in the organic solvent contained in the electrolyte are preferable. Specific examples of the preferable material include inorganic materials such as a polyester polymer, polyolefin polymer (for example, polyethylene and polypropylene), ether polymer, and glass.

(e) Others

In addition to the cathode, the anode, the electrolyte, and the separator, other configurations which can be commonly used in nonaqueous secondary batteries can be adopted for the nonaqueous secondary battery. Examples of other configurations include a battery casing and a safety circuit.

(f) Method of Manufacturing Nonaqueous Secondary Battery

The nonaqueous secondary battery can be prepared by, for example, laminating the cathode and the anode such that the separator is interposed therebetween. The prepared lamination including the cathode, the anode, and the separator may have, for example, a planar strip shape. In addition, when the battery having a cylindrical or flat shape is prepared, the lamination may be wound.

One or plural laminations can be inserted inside the battery casing. Typically, the cathode and the anode are connected to external conductive terminals of the battery. Next, the battery casing is typically sealed to block the lamination from the outside air.

In the case of a cylindrical battery, a method of fitting a lid with resin gasket to an opening of the battery casing to caulk the casing is commonly used as a sealing method. In addition, in the case of a square battery, a method of attaching a lid called a metal sealing plate to an opening to seal the battery casing by welding can be used. In addition to these methods, a method of sealing the battery casing using a binder and a method of fixing a lid to the battery casing with a bolt through a gasket to seal the battery casing can also be used. Further, a method of sealing the battery casing using a laminate film in which a thermoplastic resin is attached onto a metal foil can also be used. During sealing, an opening for introducing the electrolyte may be provided. In addition, before sealing, gas produced by electrically connecting the cathode and the anode to each other may be removed.

The present invention is not limited to the above description, and various modifications can be made within the scope of Claims. That is, the technical scope of the present invention also includes embodiments obtained by combining technical means which are appropriately modified within the scope of Claims.

EXAMPLES

Hereinafter, the present invention will be described in more detail based on examples. However, the present invention is not limited to the following examples. Reagents and the like used in the Examples are special grade reagents made by Kishida Chemical Co., Ltd., unless otherwise specified.

(I) Preparation of Cathode and Cathode Active Material

Example 1

<Preparation of Cathode Active Material>

Regarding starting materials, $LiOH.H_2O$ was used as a lithium source, $MnCO_3.0.5H_2O$ was used as a manganese source, $ZrOCl_2.8H_2O$ was used as a zirconium source, $(NH_4)_2HPO_4$ was used as a phosphorus source, and $AlCl_3.6H_2O$ was used as an aluminum source. When 0.25 g of $LiOH.H_2O$ was prepared as the lithium source, the respective components thereof were weighed to satisfy Li:Mn:Zr:P:Al=1:0.875:0.125:0.875:0.125. Next, these materials were pulverized and mixed using a planetary ball mill under conditions of 400 rpm and 1 hour.

A mixture obtained using the ball mill was uniformly mixed in an agate mortar after sucrose was added thereto (mixture:sucrose=100 wt %:15 wt %). The obtained mixture was calcinated in a nitrogen atmosphere at 550° C. for 12 hours. As a result, a single-phase powder $Li Mn_{0.875}Zr_{0.125}P_{0.875}Al_{0.125}O_4$ (cathode active material) was synthesized.

<Preparation of Cathode>

About 1 g of the obtained cathode active material was weighed and prepared and was pulverized in an agate mortar. About 10 wt % of acetylene black (product name: "Denka Black," made by Denki Kagaku Kogyo Kabushiki Kaisha) as the electrically conductive material with respect to the cathode active material; and about 10 wt % of polyvinylidenefluoride resin powder (product name: "Denka Black," made by Denki Kagaku Kogyo Kabushiki Kaisha) as the binder with respect to the cathode active material were mixed with the pulverized material.

This mixture was dissolved in N-methyl-2-pyrrolidone to obtain a slurry, and the slurry was applied to both surfaces of an aluminum foil having a thickness of 20 μm using a doctor blade method. The coating amount was about 5 mg/cm². A cathode was prepared by drying and pressing the coating film.

Example 2

Regarding starting materials, $LiOH.H_2O$ was used as a lithium source, $MnCO_3.0.5H_2O$ was used as a manganese source, $ZrOCl_2.8H_2O$ was used as a zirconium source, $(NH_4)_2HPO_4$ was used as a phosphorus source, and $AlCl_3.6H_2O$ was used as an aluminum source. When 0.25 g of $LiOH.H_2O$ was prepared as the lithium source, the respective components thereof were weighed to satisfy Li:Mn:Zr:P:

Al=1:0.95:0.05:0.95:0.05. Next, these materials were pulverized and mixed using a planetary ball mill under conditions of 400 rpm and 1 hour.

A mixture obtained using the ball mill was uniformly mixed in an agate mortar after sucrose was added thereto (mixture:sucrose=100 wt %:15 wt %). The obtained mixture was calcinated in a nitrogen atmosphere at 550° C. for 12 hours. As a result, a single-phase powder Li$Mn_{0.95}Zr_{0.05}P_{0.95}Al_{0.05}O_4$ (cathode active material) was synthesized.

Example 3

Regarding starting materials, $LiOH.H_2O$ was used as a lithium source, $MnCO_3.0.5H_2O$ was used as a manganese source, $Ti(OC_4H_9)_4$ was used as a titanium source, $(NH_4)_2HPO_4$ was used as a phosphorus source, and $AlCl_3.6H_2O$ was used as an aluminum source. When 0.25 g of $LiOH.H_2O$ was prepared as the lithium source, the respective components thereof were weighed to satisfy Li:Mn:Ti:P:Al=1:0.95:0.05:0.95:0.05. Next, these materials were pulverized and mixed using a planetary ball mill under conditions of 400 rpm and 1 hour.

A mixture obtained using the ball mill was uniformly mixed in an agate mortar after sucrose was added thereto (mixture:sucrose=100 wt %:15 wt %). The obtained mixture was calcinated in a nitrogen atmosphere at 550° C. for 12 hours. As a result, a single-phase powder $LiMn_{0.95}Ti_{0.05}P_{0.95}Al_{0.05}O_4$ (cathode active material) was synthesized.

Example 4

Regarding starting materials, $LiOH.H_2O$ was used as a lithium source, $MnCO_3.0.5H_2O$ was used as a manganese source, $SnCl_4.5H_2O$ was used as a tin source, $(NH_4)_2HPO_4$ was used as a phosphorus source, and $AlCl_3.6H_2O$ was used as an aluminum source. When 0.25 g of $LiOH.H_2O$ was prepared as the lithium source, the respective components thereof were weighed to satisfy Li:Mn:Sn:P:Al=1:0.95:0.05:0.95:0.05. Next, these materials were pulverized and mixed using a planetary ball mill under conditions of 400 rpm and 1 hour.

A mixture obtained using the ball mill was uniformly mixed in an agate mortar after sucrose was added thereto (mixture:sucrose=100 wt %:15 wt %). The obtained mixture was calcinated in a nitrogen atmosphere at 550° C. for 12 hours. As a result, a single-phase powder Li$Mn_{0.95}Sn_{0.05}P_{0.95}Al_{0.05}O_4$ (cathode active material) was synthesized.

Comparative Example 1

Regarding starting materials, $LiOH.H_2O$ was used as a lithium source, $MnCO_3.0.5H_2O$ was used as a manganese source, and $(NH_4)_2HPO_4$ was used as a phosphorus source. When 0.25 g of $LiOH.H_2O$ was prepared as the lithium source, the respective components thereof were weighed to satisfy Li:Mn:P=1:1:1 by molar ratio. Next, these materials were pulverized and mixed using a planetary ball mill under conditions of 400 rpm and 1 hour.

A mixture obtained using the ball mill was uniformly mixed in an agate mortar after sucrose was added thereto (mixture:sucrose=100 wt %:15 wt %). The obtained mixture was calcinated in a nitrogen atmosphere at 600° C. for 12 hours. As a result, a single-phase powder $LiMnPO_4$ (cathode active material) was synthesized.

A cathode was prepared by performing the same manipulation as that of Example 1 on the obtained cathode active material.

Comparative Example 2

Regarding starting materials, $LiOH.H_2O$ was used as a lithium source, $MnCO_3.0.5H_2O$ was used as a manganese source, $Fe(NO_3)_3.9H_2O$ was used as an iron source, and $(NH_4)_2HPO_4$ was used as a phosphorus source. When 0.25 g of $LiOH.H_2O$ was prepared as the lithium source, the respective components thereof were weighed to satisfy Li:Mn:Fe:P=1:0.875:0.125:1 by molar ratio. Next, these materials were pulverized and mixed using a planetary ball mill under conditions of 400 rpm and 1 hour.

A mixture obtained using the ball mill was uniformly mixed in an agate mortar after sucrose was added thereto (mixture:sucrose=100 wt %:15 wt %). The obtained mixture was calcinated in a nitrogen atmosphere at 600° C. for 12 hours. As a result, a single-phase powder Li$Mn_{0.875}Fe_{0.125}PO_4$ (cathode active material) was synthesized.

A cathode was prepared by performing the same manipulation as that of Example 1 on the obtained cathode active material.

Comparative Example 3

Regarding starting materials, $LiOH.H_2O$ was used as a lithium source, $MnCO_3.0.5H_2O$ was used as a manganese source, $ZrOCl_2.8H_2O$ was used as a zirconium source, $(NH_4)_2HPO_4$ was used as a phosphorus source, and $AlCl_3.6H_2O$ was used as an aluminum source. When 0.25 g of $LiOH.H_2O$ was prepared as the lithium source, the respective components thereof were weighed to satisfy Li:Mn:Zr:P:Al=1:0.7:0.3:0.7:0.3. Next, these materials were pulverized and mixed using a planetary ball mill under conditions of 400 rpm and 1 hour.

A mixture obtained using the ball mill was uniformly mixed in an agate mortar after sucrose was added thereto (mixture:sucrose=100 wt %:15 wt %). The obtained mixture was calcinated in a nitrogen atmosphere at 600° C. for 12 hours. As a result, impurities were formed, and thus a single-phase powder $LiMn_{0.7}Zr_{0.3}P_{0.7}Al_{0.3}O_4$ (cathode active material) was not able to be obtained.

Since the single-phase powder was not obtained, other measurements were not performed.

Comparative Example 4

Regarding starting materials, LiOH.H2O was used as a lithium source, FeC2O4 was used as an iron source, ZrOCl2.8H2O was used as a zirconium source, (NH4)2HPO4 was used as a phosphorus source, and AlCl3.6H2O was used as an aluminum source. When 0.25 g of LiOH.H2O was prepared as the lithium source, the respective components thereof were weighed to satisfy Li:Fe:Zr:P:Al=1:0.875:0.125:0.875:0.125. Next, these materials were pulverized and mixed using a planetary ball mill under conditions of 400 rpm and 1 hour.

A mixture obtained using the ball mill was uniformly mixed in an agate mortar after sucrose was added thereto (mixture:sucrose=100 wt %:15 wt %). The obtained mixture was calcinated in a nitrogen atmosphere at 600° C. for 12 hours. As a result, a single-phase powder Li$Fe_{0.875}Zr_{0.125}P_{0.875}Al_{0.125}O_4$ (cathode active material) was synthesized.

A cathode was prepared by performing the same manipulation as that of Example 1 on the obtained cathode active material.

(II) Evaluation of Cathode Active Material

<X-Ray Analysis>

The cathode active material thus obtained was pulverized in an agate mortar. A powder X-ray diffraction pattern was obtained from the pulverized cathode active material using an X-ray analyzer (product name: MiniFlex II, made by Rigaku Corporation), and a lattice constant before charging was obtained from the obtained pattern.

(III) Evaluation of Nonaqueous Secondary Battery (III-I) Capacity Ratio $LiPF_6$ was dissolved in a solvent of 50 vol % of ethylene carbonate and 50 vol % of diethyl carbonate such that a concentration of 1 mol/L was obtained. As a result, an electrolyte was obtained. About 30 ml of the obtained electrolyte was poured into a 50 ml beaker. A nonaqueous secondary battery was obtained by immersing each of the cathodes prepared in the respective examples and comparative examples and a counter electrode of metal lithium as the anode active material in the electrolyte.

The nonaqueous secondary battery thus obtained was initially charged in an environment of 25° C. The charging current was 0.1 mA, and charging was stopped when the potential of the battery reached 4.2 V. Next, the battery was discharged at 0.1 mA, and discharging was stopped when the potential of the battery reached 2.0 V. As a result, the actual capacity of the battery was obtained. The obtained actual capacity is shown in Table 1.

(III-II) Volume Change Ratio

The battery prepared in "(III-I) Capacity Ratio" was charged by a constant current of 1 mA to 4.2 V and thus was in a state where lithium in the cathode active material was desorbed therefrom. Next, the taken-out cathode was subjected to the powder X-ray diffraction measurement to obtain a lattice constant after lithium deintercalation (after charging).

A volume change ratio was obtained based on the lattice constant before charging and the lattice constant after charging. The volume change rate is shown in Table 1.

(III-II) Capacity Retention Ratio

A capacity retention ratio of the battery prepared in "(III-I) Capacity Ratio" was measured. The charging current was 0.1 mA, and charging was stopped when the potential of the battery reached 4.2 V. After charging, the battery was discharged at 1 mA, and discharging was stopped when the potential of the battery reached 2.0 V. As a result, the initial discharge capacity of the battery was obtained. Further, charging and discharging were repeated at a current of 1 mA, the discharge capacity of a 100th cycle was measured, and the capacity retention ratio was obtained according to the following expression.

Capacity retention ratio=Discharge Capacity of 100 cycle/Initial Discharge Capacity×100

(III-III) Average Discharge Potential

An average discharge potential of the battery prepared in "(III-I) Capacity Ratio" was measured. The charging current was 0.1 mA, and charging was stopped when the potential of the battery reached 4.2 V. After charging, the battery was discharged at 1 mA, and discharging was stopped when the potential of the battery reached 2.0 V. As a result, the average discharge potential was obtained according to an expression of Total Discharge Energy/Total Discharge Capacity.

The volume change ratio, the initial discharge capacity, the capacity retention ratio, and the average discharge potential obtained in the above-described measurements are shown in Table 1.

TABLE 1

| | Cathode Active Material | Volume change Ratio (%) | Initial Discharge Capacity (mAh/g) | Capacity Retention Ratio After 100 Cycles (%) | Average Discharge Potential (V) |
| --- | --- | --- | --- | --- | --- |
| Example 1 | $Li(Mn_{0.875}Zr_{0.125})(P_{0.875}Al_{0.125})O_4$ | 7.43 | 120.1 | 88.2 | 3.85 |
| Example 2 | $Li(Mn_{0.95}Zr_{0.05})(P_{0.95}Al_{0.05})O_4$ | 7.92 | 125.3 | 86.1 | 3.87 |
| Example 3 | $Li(Mn_{0.95}Ti_{0.05})(P_{0.95}Al_{0.05})O_4$ | 7.86 | 115.2 | 86.5 | 3.86 |
| Example 4 | $Li(Mn_{0.9}Sn_{0.1})(P_{0.9}Al_{0.1})O_4$ | 6.90 | 100.1 | 89.4 | 3.88 |
| Comparative Example 1 | $LiMnPO_4$ | 9.05 | 20.1 | 49.8 | 3.92 |
| Comparative Example 2 | $Li(Mn_{0.875}Fe_{0.125})PO_4$ | 8.73 | 136.2 | 70.1 | 3.83 |
| Comparative Example 4 | $Li(Fe_{0.875}Zr_{0.125})(P_{0.875}Al_{0.125})O_4$ | 4.03 | 105.0 | 90.5 | 3.25 |

It was found from Table 1 that the capacity retention ratio was superior in the cathode active material in which the volume change ratio was lower than 8%.

It was found from Example 1 and Comparative Example 2 that the initial discharge capacity of the case where the Mn site was substituted with Zr was higher than that of the case where the Mn site was substituted with Fe.

It was confirmed from the results of Example 1 and Comparative Example 4 that, by substituting the Mn site with Fe, the capacity retention ratio was improved; however, the average discharge potential was significantly decreased.

In addition, it was found from the result of Comparative Example 3 that, when the substitution amount of Al was too large, impurities were formed, and a single-layer crystal was not formed.

INDUSTRIAL APPLICABILITY

The cathode active material according to the present invention is superior in safety and cost and makes it possible to provide a battery having a long life. Therefore, the cathode active material according to the present invention can be suitably used as a cathode active material of a nonaqueous secondary battery such as a lithium ion battery.

The invention claimed is:

1. A cathode active material having a composition represented by the following formula (1):

$$LiMn_{1-x}M_xP_{1-y}Al_yO_4 \quad (1)$$

(wherein M is at least one selected from the group consisting of Ti, V, Zr, Sn and Y, x is in a range of 0<x<0.5, and y is in a range of 0<y<0.25).

2. The cathode active material according to claim 1, wherein the cathode active material has a volume change ratio of 8% or lower caused by Li intercalation/deintercalation.

3. The cathode active material according to claim 1, wherein M is Zr, and x is in a range of 0.01≤x≤0.25.

4. A cathode comprising:
the cathode active material according to any one of claims 1;
an electrically conductive material; and
a binder.

5. A nonaqueous secondary battery comprising:
the cathode according to claim 4;
an anode;
an electrolyte; and
a separator.

* * * * *